United States Patent

Doland et al.

[15] 3,637,037
[45] Jan. 25, 1972

[54] AUTO THEFT PROTECTION SYSTEM

[72] Inventors: George D. Doland; George J. Doland; Charles M. Doland, all of 1602 Redway Lane, Houston, Tex. 77058

[22] Filed: Nov. 24, 1969

[21] Appl. No.: 879,346

[52] U.S. Cl. ............................................. 180/114, 340/64
[51] Int. Cl. ............................... B60r 25/04, B60r 25/10
[58] Field of Search ................................. 180/114; 340/63, 64

[56] References Cited

UNITED STATES PATENTS

| | | | |
|---|---|---|---|
| 3,453,591 | 7/1969 | Perez | 340/64 |
| 2,515,044 | 7/1950 | Kappel | 180/114 X |
| 2,583,752 | 1/1952 | Smith | 340/64 |
| 3,058,092 | 10/1962 | Johnson | 340/64 |
| 3,174,502 | 3/1965 | Howarth et al. | 180/114 UX |
| 3,192,395 | 6/1965 | Langlois | 180/114 X |
| 3,242,460 | 3/1966 | Morrell | 340/64 |
| 3,430,058 | 2/1969 | Yoshida | 340/64 |
| 3,464,060 | 8/1969 | Arditti | 340/64 |
| 3,524,989 | 8/1970 | Pecott | 180/114 X |
| 3,525,414 | 8/1970 | Copelan | 180/114 |

FOREIGN PATENTS OR APPLICATIONS 1,098,838 2/1961 Germany ..................... 180/114

Primary Examiner—Benjamin Hersh
Assistant Examiner—John P. Silverstrim

[57] ABSTRACT

An automobile antitheft device which sounds an alarm and makes the automobile inoperative even when the automobile is "hot wired" or the ignition keys are available to the thief. A multiposition ignition switch has a first terminal which completes a circuit to energize a first relay to enable normal starting and operation; and a number of other terminals which complete a circuit to energize a second relay which energizes an alarm and other circuits for making the automobile inoperative.

6 Claims, 2 Drawing Figures

INVENTORS
George D. Doland
George F. Doland
Charles M. Doland

AUTO THEFT PROTECTION SYSTEM

The auto theft protection system consists of two assemblies, and ancillary items if desired. One assembly is located in convenient place near the ignition switch or within reach of the driver. This assembly is the control unit and contains only a multiposition switch. The second assembly is the main unit and is generally located under the automobile hood but may be located at any available space in the automobile. In the minimum system, no additional items are required other than the normal automobile parts.

Figure 1:
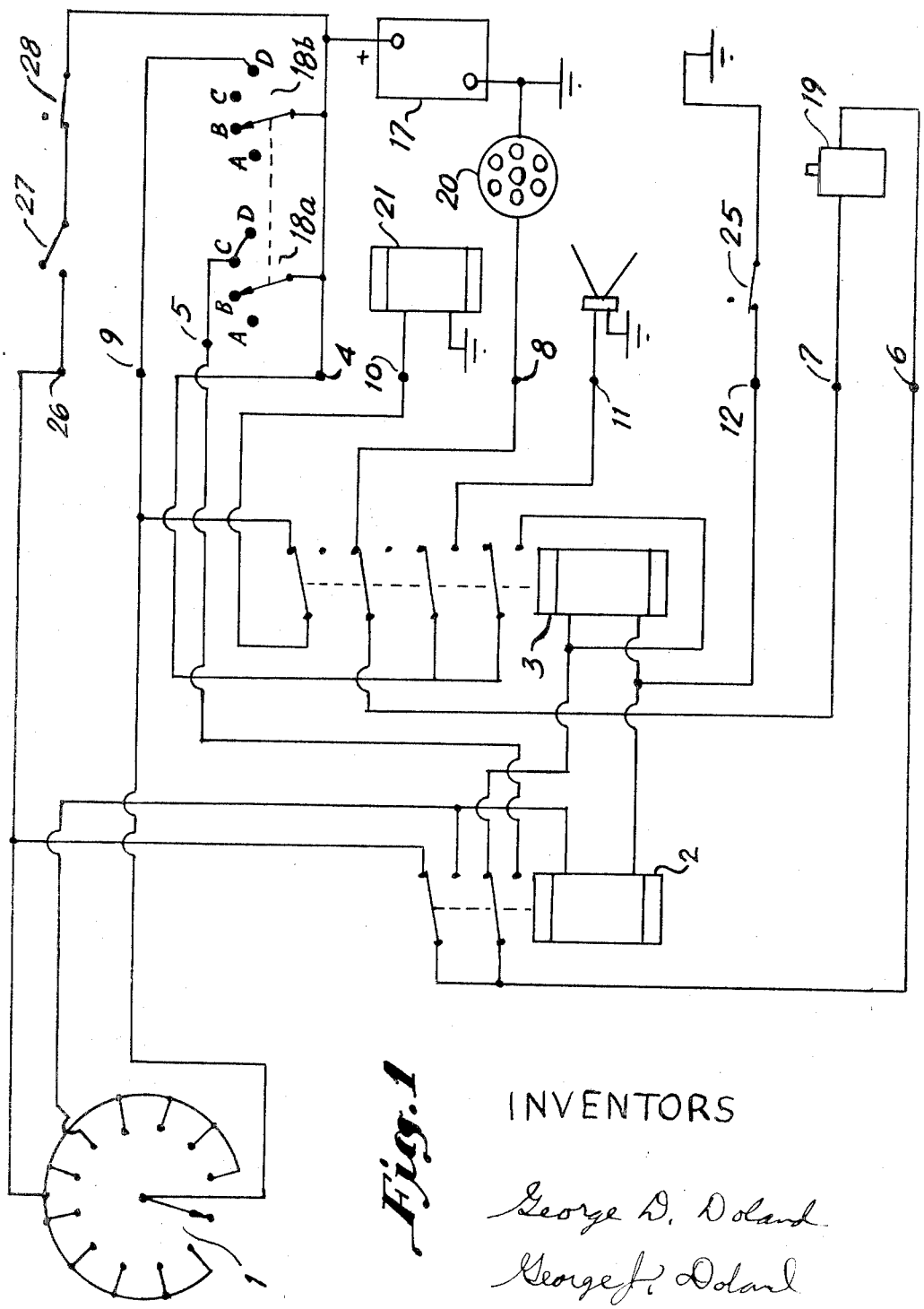

The minimum system is described in reference to FIG. 1. Item 1 is the multiposition switch located in the control unit. A 12-position switch is shown but either a greater or a fewer number of positions may be used. If desired, decade type of switches may also be used to increase the number of positions. The movable contact of the switch is shown in position 1. This is the off position and is optional. Position 8 in the figure is the only position which permits normal operation of the automobile. The lead from this position is connected to the coil of relay 2. All other switch positions cause the alarm to be sounded and the automobile to be disabled if an attempt is made to start the engine. The off position, which is optional, turns off the alarm system but the car is also inoperative. When the off position is not desired, all switch positions are wired the same except the one position required for normal operation. The position which permits normal operation will be different switch positions for the various units manufactured. Unless the correct position is known, a position which causes the alarm to be sounded is likely to be selected.

Only two relays are required and located in the main assembly. Item 2 is the ignition relay and item 3 is the alarm relay. When the equipment is off, neither relay is energized so the protection system does not require power in the dormant state. When the automobile engine is operating, the ignition relay is energized and the alarm relay is deenergized. When the alarm is operating, the alarm relay is energized and the ignition relay is deenergized. Items 4 through 12 are the leads or terminals for connecting the protection system to the automobile. One of the features of this protection system is that the system consists of a minimum number of parts.

When the protection system is installed, it is necessary to remove some of the automobile electrical system connections and replace them with connections to the protection system. A wire is connected from the automobile battery 17 to terminal 4. Since the internal connection from terminal 4 is to open relay contacts on the alarm relay no power is supplied through terminal 4 unless the alarm relay is energized. Modern vehicles use two-section four-position switches for the ignition switch. In the figures, one section is the ignition switch 18a which controls the ignition circuit while the other section is called the starter switch 18b which controls the starter. Position A turns on selected accessories, position B is the off position, position C turns the ignition on and position D turns on the ignition and starter. The wire from the ignition switch 18a terminals C and D to the ignition coil is removed and the ignition switch is connected to terminal 5. When the ignition switch is placed in the on position, power is fed to the open contacts on the ignition relay 2. A wire is connected from terminal 6 to the ignition coil 19 terminal where the ignition switch wire was removed. Power will only be supplied to the ignition coil when the ignition relay is energized. These connections are made when the ignition system is conventional. For transistorized ignition systems the same steps are taken but the connections are made to the transistor ignition unit.

For conventional ignition systems only, the lead between the ignition coil 19 and the distributor 20 is removed. A lead is connected from terminal 7 to the ignition coil 19 where the lead to the distributor 20 was removed. A wire is required from terminal 8 to the distributor 20 where the lead was removed. These connections prevent the theft of the car by simply connecting a wire from the battery to the ignition coil 19. However, some protection is obtained without removing the wire from the coil to the distributor and making the connections described. If this feature is omitted, one set of relay contacts shown need not be provided.

For automobiles with transistorized ignition systems, the circuit description of the preceding paragraph is not applicable. "Hot wire" protection can be provided for transistor ignition systems of the type described in the preceding paragraph if the return wire from the transistor unit is available. The return wire from the transistor unit is connected to terminal 7 and terminal 8 is grounded. For either the conventional or the transistor ignition system, the ignition system is disabled when the alarm relay 3 is energized and the circuit connected as described in the last two paragraphs.

Power for the protection system is obtained from the starter switch 18b terminal D which is connected to terminal 9. When the starter switch is placed in the start position D, power is fed through terminal 9 to the control switch movable contact. The results obtained will depend upon the switch position selected. If the off position is selected, the circuit is open and the system is inoperative. If the correct position is selected, power is fed through the switch to the ignition relay 2, causing it to be energized. Once energized, the ignition relay remains energized by power from the ignition switch 18a, through terminal 5, through the relay contacts to the relay coil. Power from the ignition switch also flows from the relay contacts to the ignition coil via terminal 6. The circuit from the coil is completed via terminal 7, through the alarm relay contacts to terminal 8 and to the distributor 20. Normal operation is obtained. When the ignition switch is placed in the off position, power is removed from the ignition relay coil causing it to deenergize opening the ignition circuit. This causes the engine to stop operating.

When the starter switch 18b is placed in the start position D and the control switch 1 is in an incorrect position, power is fed from the starter switch through terminal 9, through the control switch, through the contacts of the ignition relay to the coil of the alarm relay causing it to be energized. Once energized, power is fed from the battery 17 through terminal 4 and through the contacts of the alarm relay to the alarm relay coil keeping it energized even though the starter switch is moved from the start position. Power will also flow from the alarm relay coil through the ignition relay contacts and through the control switch back to terminal 9. If terminal 9 is connected through a wire to the starter contactor 21, the starter will be operated. This problem can be avoided as shown in the diagram. The starter contactor 21 is not connected to the starter switch. Instead, when the protection system is installed, the wire from the starter switch to the starter contactor is removed and the starter contactor 21 is wired to terminal 10. Therefore, when the wrong position is selected by the control switch and the starter switch is placed in the start position, the alarm relay is energized and the circuit to the starter contactor is open. This causes the starter to be inoperative. This feature provides additional protection from theft.

When the alarm is energized, power from the battery and through terminal 4, is fed through the alarm relay contacts and is fed to the alarm device. This alarm device may be the automobile horn but is not limited to the horn. Typical alarm devices are flashing lights, a bell, or siren. When the horn is used, as the alarm, the horn 22 is connected to terminal 11. When the alarm is not operating the alarm relay is deenergized, the horn by be used in the normal fashion without effecting the protection circuit as the alarm relay contacts are open disconnecting the horn circuit from other parts of the protection system.

When the alarm relay is energized, power from the battery 17, through terminal 4 and the alarm relay contacts, is fed to the alarm relay coil causing it to remain energized. Once energized, it remains energized until power is removed from the system. As shown in the FIG. 1, the return from the ignition relay and the alarm relay is through terminal 12. The circuit to ground may be opened to deenergize the alarm relay. When this means is used, neither relay can be energized. When the ignition relay is deenergized, the ignition system is still inoperative providing protection from theft. In order to avoid disconnecting leads to turn off the alarm, a switch may be used to open the ground circuit from terminal 12 or open the power lead to terminal 4. A switch 25 to open the ground circuit is desired because it also makes the automobile inoperative. This alarm disable switch 25 may be installed in the automobile in a hidden location so it is not readily available to the thief. Typical locations are the glove compartment and the trunk since they can be locked. The alarm disable switch 25 can also be hidden under the hood and in a closed box. Another alternative is to use a key-locked switch. Regardless of the switch location, in order to operate the automobile after the alarm is operating, it is necessary to open the alarm disable switch 25 and again close it to provide a circuit for the ignition relay. If the correct position is not selected with the control switch, the alarm is again initiated when an attempt is made to start the engine. The protection system can be defeated by disconnecting the battery from terminal 4 as the thief could try each position in rapid succession until the correct switch position is found. To avoid defeat of the system by a thief, the wires from the protection system would be connected to the automobile electrical system at points or terminals where the function of the connection cannot be easily determined.

In FIG. 1, three wires are shown connecting the control switch with the relays in the main assembly. A thief could disable the protection switch if the correct wire between the two units was cut. The function of the wire would not be designated by the wire color. Redundant wires can be provided for the leads to the incorrect positions. This would make it very difficult to select the wires for disabling the alarm and cutting them while the wires required for the automobile operation remain connected. If the wires are cut at the main assembly, the automobile is disable. To ensure the wires are not traced by opening the assemblies, they are riveted or otherwise closed so they cannot be readily opened.

The usual method of avoiding the locked ignition system is to connect a wire directly from the battery to the ignition coil. This connection is often made at the ignition switch. When a wire is connected from the battery to the ignition coil or transistor ignition unit, power is fed through terminal 6 and the ignition relay contacts to the alarm relay coil causing it to be energized. As a consequence, the alarm is turned on and the automobile disabled.

This minimum protection system both sounds an alarm and disables the automobile when the wrong switch position is selected and an attempt is made to start the engine. The system provides protection when "hot wired" by a thief. The system cannot be readily bypassed or disabled without disabling the automobile also. The system is also very simple to use. To start the car, all that is required is to select the correct position for the control switch. After the engine is operating, the control switch is set to a different position. Once the control knob is set to an incorrect position and the thief does not know the correct position, the car is protected even if the keys are left in the automobile as long as the engine is not operating.

Figure 2:
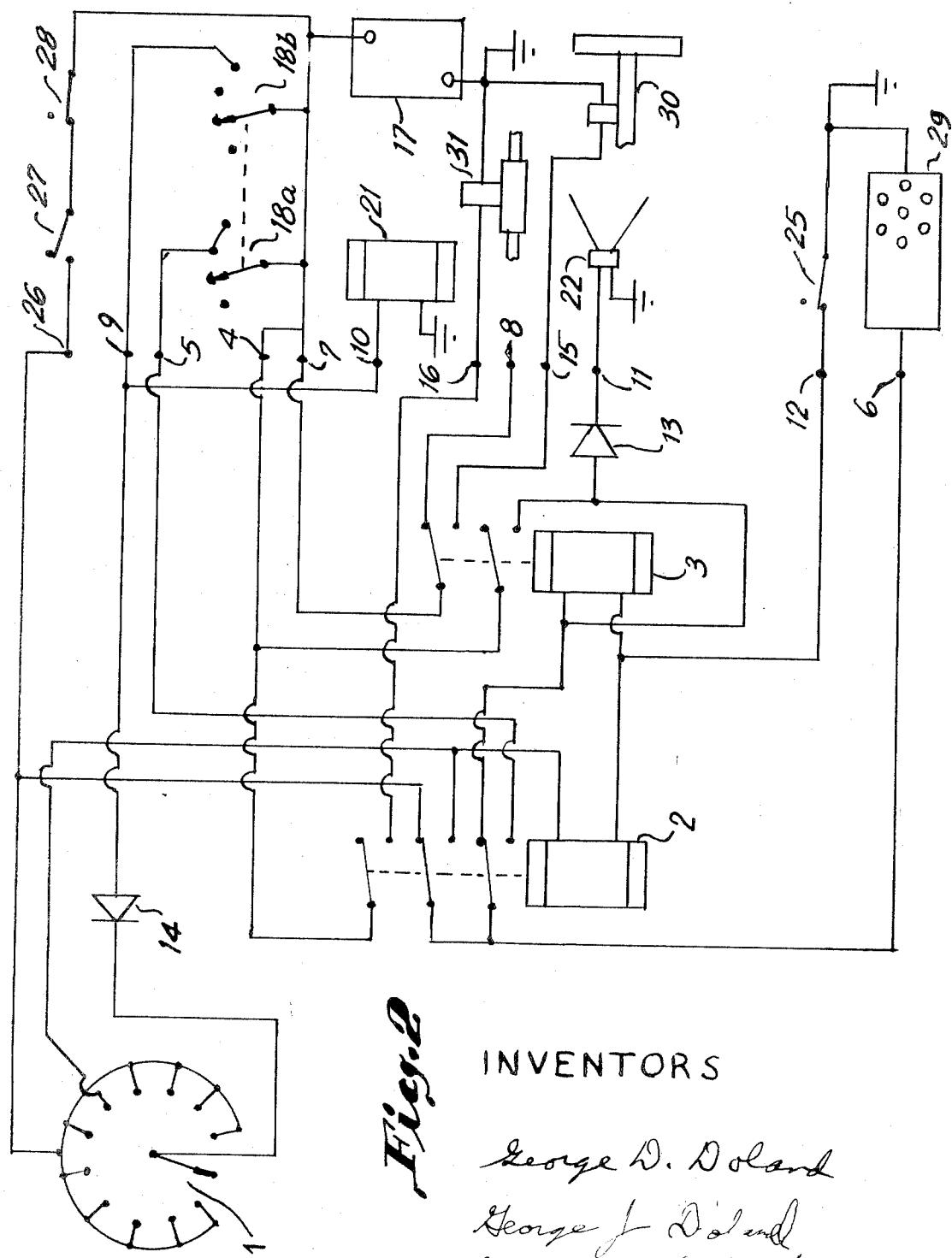

The minimum system can be modified to either provide additional protection or reduce cost while maintaining the capability to protect the automobile. FIG. 2 shows a portion of the protection system modified to reduce the number of contacts on the alarm relay. In FIG. 2, the items with the same function as in FIG. 1 are numbered the same and the description of these items for FIG. 1 applies to FIG. 2 unless modified in the following description. In FIG. 1, contacts were provided on the alarm relay to prevent malfunction of the protection system when the horn was used. In FIG. 2, a diode 13 is provided for this purpose. The diode permits power to flow from the battery through terminal 4 and the alarm relay contacts (when energized) to the horn but does not allow power from the horn to flow to the relay coil.

In FIG. 1, contacts were provided to prevent the starter from operating when the alarm relay was energized. In FIG. 2, diode 14 prevents power from flowing from the protection device to the starter circuit. Operation of the starter switch will cause the starter to operate regardless of the alarm relay position when terminal 9 is connected to the starter switch and terminal 10 is connected to the starter contactor.

In FIG. 2, the diodes are shown for an automobile electrical system with the negative terminal of the battery grounded. If the positive side is grounded, the diode must be reversed for the required operation.

In FIG. 2, a set of relay contacts are provided for theft protection use and are connected to terminals 7, 8 and 15. When terminals 7 and 8 are used as described for FIG. 1, the circuit from the ignition coil to the distributor is opened when the alarm relay is energized. In FIG. 2, a transistorized ignition system 29 is shown connected to terminal 6 and controlled by the ignition relay 2. A steering wheel lock 30 is shown connected to terminal 15 and controlled by alarm relay 3. This feature, "hot wire" protection, may be obtained in an alternate way. Instead of connecting this portion of the device as described, terminal 8 is connected to terminal 10 and the starter contactor wire is connected to terminal 7. This configuration is not shown. "Hot wire" protection is provided because a "hot wire" connection to terminal 6 will cause the alarm relay to be energized. When the alarm relay is energized, the starter circuit is opened and the starter will not operate. The method of connecting the protection system provides protection by disabling the starter circuit.

There are other methods which can be used to make the automobile inoperative. One of these is to turn off the gasoline supply. This can be accomplished using the circuit of FIG. 2 by connecting terminal 7 to the battery and terminal 15 to a solenoid-controlled valve in the gasoline line. This configuration is not shown. When connected as described, the valve would be open when the solenoid is deenergized. When the alarm is on, power would be applied to the solenoid and turn off the gasoline supply. A normally closed solenoid-controlled valve could also be used to control the gasoline flow. With a normally closed valve, power is required to open the valve. The power for the valve would be controlled by the ignition relay. In FIG. 2, a normally closed solenoid gasoline control valve 31 is shown connected to terminal 16 and controlled by the ignition relay 2. If this feature is not desired, the contacts need not be provided on the relay.

The gasoline control valve is only one of several different ancillary devices which may be provided for theft protection. A solenoid-controlled steering lock, a lock for the transmission to prevent shifting gears, a lock for the drive shaft or differential to prevent the application of driving power, and other devices may be used. Because may different types of ancillary devices may be used and some controlled by the application of power and others operative without the application of power, a thief may be deterred simply because the automobile is protected by the system.

When a thief discovers the automobile is equipped with a protection system but is not deterred, the most likely step would be to open the hood to examine the system. The hood may be opened to "hot wire" the car even though the thief is not aware the automobile is protected. In either case, it is desirable to set off the alarm if the hood is opened. However, provisions must be made to permit opening the hood when desired, without setting off the alarm. This can be accomplished with this protection system using a normally closed momentary contact push-type switch. The switch is mounted so that the contacts are open when the hood is closed. When the hood is released and opened slightly the switch is released and the contacts close. One terminal of the switch 27 is connected to the automobile battery. The other terminal of the switch 27 is connected to the protection device at terminal 26 in the figures. When the hood protection switch 27 closes and applies power to terminal 26, and the ignition relay is not energized, power is fed through the ignition relay contacts and actuates the alarm relay. When the driver desires to open the hood without an alarm, it is necessary to have the ignition relay energized. This may be accomplished by having the engine running. The ignition relay may also be energized without the engine running by placing the control switch in the correct position for normal operation, turning on the ignition and turning the switch to the start position but releasing the switch to the ignition position before the engine starts.

Some drivers may prefer a control switch for the hood instead of using the method described above for opening the hood. This can be readily accomplished using the control switch 28 provided. If a separate hood sensor control switch 28 is not desired then the control switch 1 can be used. A second deck is required for the hood control. One terminal for this switch is the connection to the movable contact or pole. The fixed contacts for all switch positions are connected together except one. No connection is made to this isolated contact. When the control switch is placed in the position with the isolated contact, the hood may be opened without the alarm. The connection which is common for all switch positions but one is the second terminal for the switch. When installed, the hood protection switch is wired in series with the hood control switch.

Another feature of the system which may be used, if desired, is a hood lock. The hood lock may be also used with the hood alarm described in the preceding two paragraphs. The hood lock is a solenoid-operated lock which prevents opening the hood when the alarm is operating although it may permit partial opening. Many automobiles are equipped with double latches for the hood. The solenoid control lock may be located so that the solenoid lock prevents opening the second latch. An alternate system is also available. The hood may be continuously locked by the solenoid-controlled lock unless released by applying power to the solenoid. The solenoid is connected to the system as an ancillary automobile protection device as described previously. When hood alarm or lock devices are provided, the alarm release switch must be located at some place other than under the hood.

Should the owner of the vehicle desire others to operate the vehicle without the protection system operating, such as may be required while the automobile is being repaired or in an attended parking lot, the control switch is set to the correct position. To avoid letting others know the correct position, the correct position could be selected and the knob removed. An alternate is to loosen the knob, rotate it to a new position without turning the switch shaft, and then tightening the knob indicating an incorrect position. Another method is to provide a knob of the push-on type which can be placed in several positions. The owner may change the correct number by simply removing the knob and placing it on in a new position.

Although the system is called an auto theft protection system, the system may be used to prevent theft of trucks, buses, and other land vehicles. It is also applicable to any mobile device or machine having an electrical system similar to the ignition systems described.

Having described the thiefproof auto protection system, we claim the following:

1. A protection system comprising a multiposition control switch, an ignition relay controlled by said multiposition switch using vehicle battery power via the said vehicle ignition switch in the start position and said multiposition switch in the correct position, an alarm relay controlled by said multiposition switch using vehicle battery power via the vehicle ignition switch in the start position and said multiposition switch in an incorrect position, a relay contact means to latch said ignition relay in the energized position utilizing vehicle battery power via the vehicle ignition switch in the ignition on position, a relay contact means for latching said alarm relay in the energized position using vehicle battery power, a relay contact means for providing vehicle battery power to an alarm when the alarm relay is energized, a relay contact means for disabling the vehicle ignition system when the ignition relay is deenergized, a relay contact means for energizing the alarm relay when a hot wire jumper is connected between the vehicle battery and vehicle ignition coil terminal, and a terminal provided or the return power lead of said alarm relay and said ignition relay, to said terminal is connected one lead of a reset switch, the other lead from said reset switch is connected to the vehicle ground.

2. A protection system as described in claim 1 wherein said alarm relay provides a means to disable the vehicle ignition system.

3. A protection system as described in claim 1 wherein a terminal is provided for connecting at least one auxiliary device to disable the vehicle, said terminal being connected to said alarm circuit which controls vehicle power to said auxiliary device.

4. A protection system as described in claim 1 wherein a terminal is provided for connecting at least one sensor to detect unauthorized tampering with the vehicle, said terminal being connected to the ignition circuit relay contact to provide power through said contacts to said alarm relay.

5. A protection system comprising a multiposition control switch, an ignition relay controlled by said multiposition switch using vehicle battery power via the vehicle ignition switch in the start position and said multiposition switch in the correct position, an alarm relay controlled by said multiposition switch using vehicle battery power via the vehicle ignition switch in the start position and said multiposition switch in an incorrect position, a relay contact means to latch said ignition relay in the energized position utilizing vehicle battery power via the vehicle ignition switch in the ignition on position, a relay contact means for latching said alarm relay in the energized position using vehicle battery power, a relay contact means for providing vehicle battery power to an alarm when the alarm relay is energized, a relay contact means for disabling the vehicle ignition system when the ignition relay is deenergized, a relay contact means for energizing the alarm relay when a hot wire jumper is connected between the vehicle battery and vehicle ignition coil terminal, and a starter circuit diode in series with the lead to said multiposition switch wiper contact preventing electric current from operating the vehicle starter contactor when the vehicle ignition switch is in the ignition on position after an attempt is made to start the vehicle engine.

6. A protection system comprising a multiposition control switch, an ignition relay controlled by said multiposition switch using vehicle battery power via the vehicle ignition switch in the start position and said multiposition switch in the correct position, an alarm relay controlled by said multiposition switch using vehicle battery power via the vehicle ignition switch in the start position and said multiposition switch in an incorrect position, a relay contact means to latch said ignition relay in the energized position utilizing vehicle battery power via the vehicle ignition switch in the ignition on position, a relay contact means for latching said alarm relay in the energized position using vehicle battery power, a relay contact means for providing vehicle battery power to an alarm when the alarm relay is energized, a relay contact means for disabling the vehicle ignition system when the ignition relay is deenergized, a relay contact means for energizing the alarm relay when a hot wire jumper is connected between the vehicle battery and vehicle ignition coil terminal, and a horn circuit diode in series with the lead to the vehicle horn, when the vehicle horn is used as an alarm, preventing said alarm relay from being energized when the vehicle horn is sounded.

* * * * *